United States Patent Office 2,710,457
Patented June 14, 1955

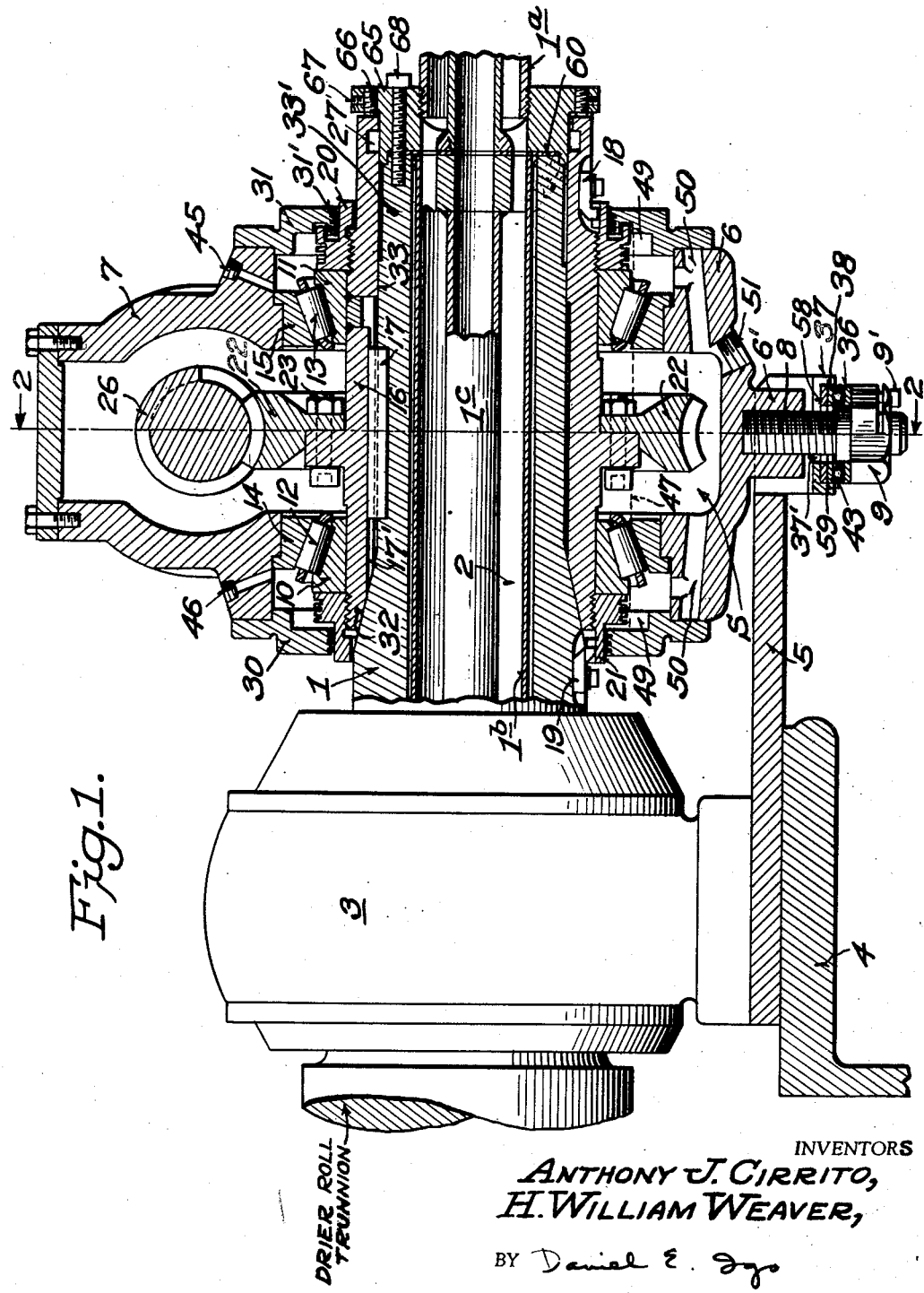

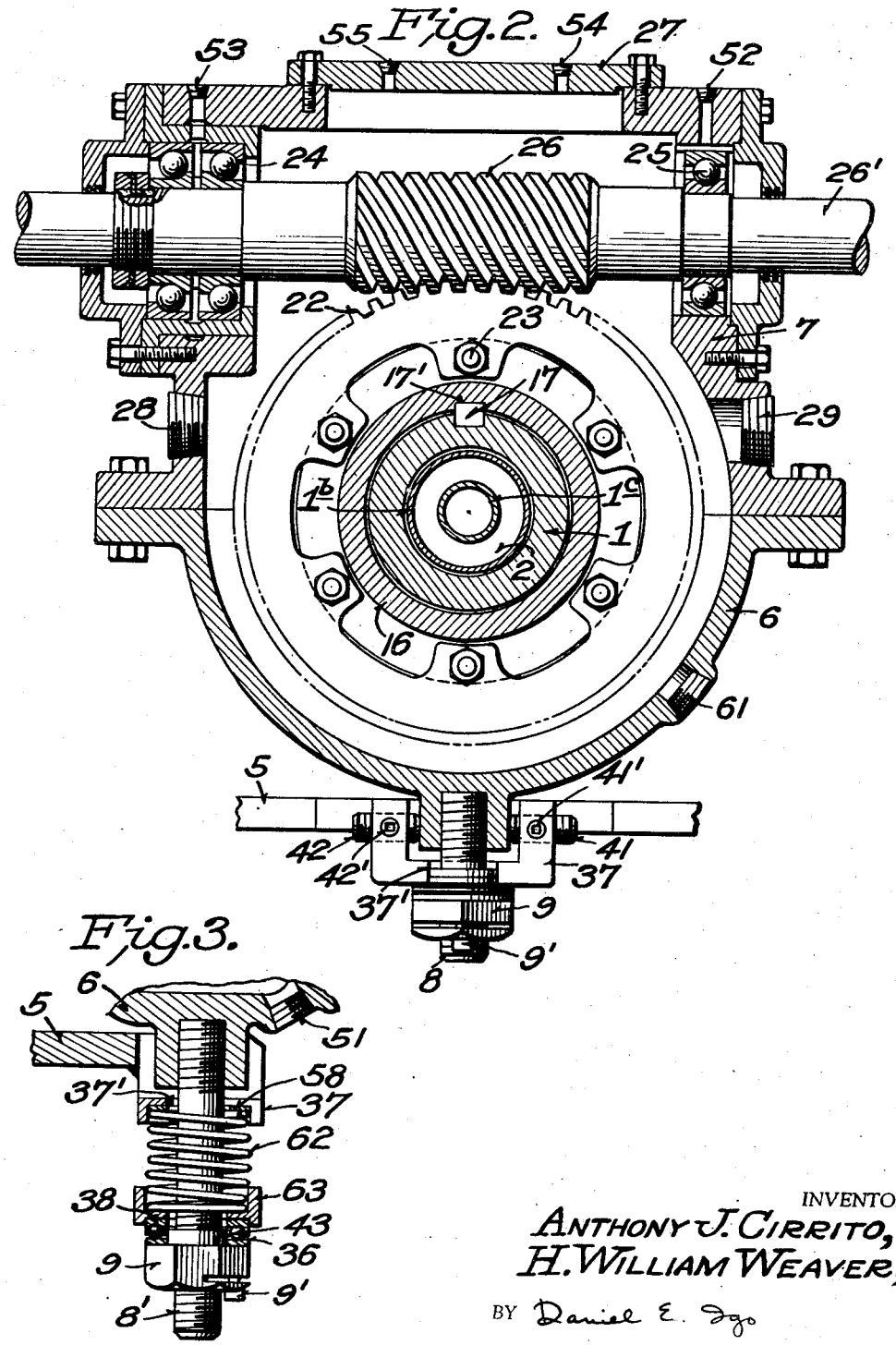

2,710,457
HIGH SPEED DRIER DRIVE

Anthony J. Cirrito, Honey Brook, and Homer William Weaver, West Chester, Pa., assignors to Lukens Steel Company, Coatesville, Pa., a corporation of Pennsylvania Application May 12, 1953, Serial No. 354,504

11 Claims. (Cl. 34—121)

This invention relates to a drive gear assembly particularly adapted for use in connection with drier rolls of the type commonly employed in paper machinery.

Such a drive may be used where several rolls are driven by means of a shaft, having a plurality of suitable gears thereon, running perpendicularly to the axes of the drier rolls and meshing with gears on said axes as in the U. S. patent to Kutter, No. 2,037,242. Shafts of this type are usually formed in sections coupled by universal joints or other suitable couplings as at 55 in the abovementioned patent. Each section may have a gear thereon, meshing with a gear on the axis of the associated drier roll. In the present instance, the line shaft is provided with worms meshing with worm gears on the drier roll shafts.

A principal object of the present invention is to provide a driving assembly having inherent characteristics limiting and correcting for misalignment of driving gears and variations in bearing clearances that they may be held within operating tolerances in any desired range of operating temperatures.

Another object is to provide a wholly enclosed drive unit which may be readily applied to or removed as a unit from the shaft of a drier roll.

Yet another object is to provide a drive unit of the aforementioned type that has considerable flexibility and includes pre-loading and centering means for maintaining the driven gear of the unit centered with respect to the driving gear.

Also, an object of this invention is to provide a driving assembly for use in connection with drier rolls comprising manual means for centering the driven gear with respect to the driving gear and pre-loading means for automatically maintaining the driven gear in the centered position.

Another object is to provide a drive unit which may be pre-adjusted on the bench, but may be further adjusted after mounting.

Another object is to provide a wholly enclosed drive unit, wherein all gears and bearings are exposed to a shower of lubricant to lubricate and cool the parts.

A further object is to provide a unit adapted to operate with wet sump or dry sump lubrication. In the wet sump operation, the bearings act as pumps to assist in circulating the lubricant. In dry sump operation, oil is continuously circulated over the gear and bearing assembly.

An additional object is to provide a drive assembly, primarily for use in connection with drier rolls, that is composed of a minimum number of parts, that is durable, that is simple to install, and that is constructed so that the parts are accessible for oiling, inspection, cleaning, and repairs.

In the drawings:

Figure 1 is a view partly in section, of the unit applied to a steam heated trunnion;

Figure 2 is a sectional view at right angles to the steam heated trunnion, taken in a vertical plane through the axis of the worm shaft; and Figure 3 is a fragmentary view similar to the lower part of Figure 1, showing spring loading of the unit.

Driving assemblies of the prior art and of this general type, have had considerable difficulty, due to the effects of thermal expansion on bearing clearances and gear alignment. The unit of this invention, which is to be hereinafter described in detail, automatically limits and corrects thermal effects on bearing clearances and gear alignment. In other words, the present unit makes provision for accurately centering the driven gear with respect to the driving gear, and this centering means may be manually adjusted as circumstances require. However, with the pre-loading arrangement of this device, the occasions for requiring further manual adjustment of the centering means are practically eliminated as the driving gear is automatically maintained centered.

Referring to the drawings in detail, in Figure 1, numeral 1 represents the reduced end of the hollow trunnion or journal of a drier roll mounted in a conventional self-aligning bearing 3. A sleeve 1b is spaced from the inner surface of trunnion 1 to provide an air space to aid in cooling the bearing surface, later to be mentioned. Steam from pipe 1a enters the trunnion in the space 2 between the sleeve 1b and the condensate tube 1c.

A split housing comprising sections 6 and 7 is provided for enclosing the driving gears and bearings and to provide a sump for oil, and this housing is connected to a vertically resilient torque arm 5 attached to the frame 4 of the drier. Arm 5 is provided with a boss 37 which, by means of nut 9 and a stud 8, mounted in a projection 6' on housing section 6, the gear housing is secured with the drier roll. A further function of this mounting means will be described hereinafter.

A journal sleeve 16 surrounds the trunnion 1, but is spaced therefrom except at areas or surfaces 32 and 33. The sleeve and trunnion are provided with mating, rather steep tapers at area 32 which prevent binding or freezing of the sleeve on the trunnion and thereby facilitating removal of the sleeve 16. The sleeve 16 is stepped at 33 for about one inch and to the right of this point at 33' the trunnion 1 is reduced slightly in diameter. A key 17 causes sleeve 16 and trunnion 1 to rotate together.

Inner bearing races 10 and 11 are mounted on sleeve 16 and carry tapered roller bearings 12 and 13 respectively. Outer races 14 and 15 for bearings 10 and 11 respectively are mounted in the housing 6, 7 and the bearings 12, 13 are mounted on outwardly inclined axes, bearings 12 being tapered outwardly to the left, and bearings 13 being tapered outwardly to the right, as seen in Figure 1, for reasons which will appear hereinafter. Other types of bearings may be employed in substitution for the bearings 10 and 11, such as angular contact ball bearings, or the roller bearings shown may be mounted with opposite taper.

Worm gear 22 is mounted on sleeve 16 by means of bolts 23, while worm 26, meshing with worm gear 22, is mounted in bearings 24, 25 in housing section 7 with its axis at a right angle to the axis of worm gear 22. By means of lock nuts 20, 21, mounted on opposite ends of sleeve 16, the housing 6, 7 and, with it, the bearings 12, 13 can be moved axially in either direction relative to the gear 22 and sleeve 16.

Lugs 18, 19 are mounted on trunnion 1 to engage, respectively, nuts 20 and 21, to hold them in adjusted position. The adjustments mentioned can be made at the bench so as to give correct clearance for the bearings and to bring the center line of the transverse curvature of the worm gear in line with the vertical plane through the worm, as seen in Figure 1. When the gear 22 is properly positioned, the nuts 20 and 21 are tight. To provide proper bearing clearance, these nuts will be backed off slightly and locked with lugs 18, 19. In order to observe the adjustments, and to facilitate the use of suitable gauges, removable covers 27, 28, and 29 are provided at suitable observation openings.

The housing 6, 7 is closed at its ends by a cover 30 on the inboard side, and a cover 31 on the outboard side having a labyrinth arrangement or seal 31' adapted to prevent entrance of steam into the housing. Thus, water is excluded from within the housing.

To assemble the drive unit on a drier roll, the entire unit is placed on the trunnion so that key 17 engages keyway 17' and is moved to the left in Figure 1 until the respective tapered portions of sleeve 16 and trunnion 1 engage as at 32. The tapered portions and the step 33 act to center the sleeve on the trunnion and support the work load. The sleeve 16 is locked in place on trunnion 1 by means of adjusting screws 66 in end plate 65, the latter being held securely in position by screws 68. The screws 66 are locked in adjusted position by screws 67. The shaft 26' of the worm 26 is then coupled to the drive or to other shafts 26' by suitable couplings such as couplings 55 in the patent to Kutter, above referred to.

Any necessary adjustments may be made after assembly, by removing the cover plates 30 and 31 and sliding them out of the way. Then, after removing lugs 18 and 19, the nuts 20 and 21 may be manipulated to effect necessary adjustment.

As steam enters the annular space 2, the various parts are heated and expansion results. The arrangement of the bearings 12 and 13, previously referred to, when used in combination with the preload device hereinafter to be described in detail, permits correction for misalignment inherent in bearing clearance necessary to prevent binding normally caused by the differential expansion of the adjacent parts in the presence of varying steam or fluid temperatures.

The changes in diameter of gear 22 and in diameter and length of worm 26 are not of sufficient magnitude to prevent an allowable running fit at normal operating temperatures. By normal range of operating temperatures is meant the wide range of heat transfer medium temperatures encountered through the use of high pressure driers.

The drive unit is mounted on the trunnion 1 independently of the bearing 3 and the machine frame 4, except for association with the torque arm 5 or connection thereto, as explained above and hereinafter. The torque arm also applies a force acting vertically downwardly, as seen in Figure 1, by virtue of tightening nut 9 to exert a downward force on the housing. This downward force insures centering and proper engagement of the worm 26 with the worm gear 22, when clearance exists between the bearings and their races. A thrust bearing 43 is placed between the stud nut 9 and the torque arm boss 37 to permit a limited amount of relative horizontal movement between the stud nut 9 and the boss 37, as seen in Figure 1. The nut 9 and the torque arm 5, with its natural resiliency, provide a preloading means for the bearing members and the drive unit. The preloading may be regulated further by providing a spring 62 surrounding stud 8' between the nut 9 and the boss 37, as shown in the alternate embodiment of Figure 3. By using the thrust bearing 43 with its races 36 and 38, provision is made for the limited horizontal movement of the stud nut 9. This motion prevents any thermal expansion effects of the drive unit from materially affecting the normal loading induced by the nut 9. The utilization of spring 62 is recommended when a more rigid torque arm 5 is employed.

The preloading device shown in Figure 3 consists of a longer stud 8' mounted in projection 6'. The spring is positioned by the boss 37 at one end and by a spring retaining washer 63 surrounding the stud 8' at its other end. Manipulation of the nut 9 will apply the desired amount of compression to the spring 62 and produce the necessary preloading. Lock means 9' holds the nut against turning, as is the case in connection with the showing in Figures 1 and 2.

The upper race 38 of the bearing 43 is in fixed position relative to the torque arm 5 in the embodiment of Figure 1 and in relatively fixed position or relationship when spring 62 is employed, and the lower race 36 is in fixed position in both embodiments relative to the housing section 6. The axial adjustment of gear 22, above mentioned, may be made without disturbing the preload imposed by nut 9.

The bearing race 38 for bearing 43 is mounted adjacent a washer 58 in a depression 59 on the underside of boss 37 in Figure 1, and when spring 62 is utilized as in Figure 3, the spring and retaining washer or partition 63 is positioned between washer 58 and race 38. The bearing 43 permits horizontal movement of the stud 8 when making adjustments by means of nuts 20 and 21, as described above, and avoids any tendency for the unit to tilt otherwise than is provided by the screws 41 and 42 as explained below.

Screws 41 and 42 are provided in the torque arm boss 37 for the purpose of adjusting the axis of the worm 22. By properly manipulating these screws, the housing may be turned slightly to make the axis of the worm horizontal, as seen in Figure 2. These screws are maintained in adjusted position by lock screws 41' and 42', respectively.

Removal of the drive unit is easily accomplished by removing the locking plate 65 and the key 17' and using a jack adapted to engage the groove 27' in sleeve 16 and to apply force to the end 60 of the trunnion 1. As the step 33 is only about one inch long, axially, a movement of this amount completely unseats the drive unit from the trunnion. A new or reconditioned unit may then be applied as described above. The torque arm boss is slotted as at 37' to permit removal of the unit without completely removing the preload nut 9 from the stud 8 or 8', though loosening of this nut is required to allow the bearing 43 to become unseated.

The lubrication may be either by a combination of shower and splash or by flow, as described hereinafter. Oil may be introduced at 45, 46, 52, 53, 54, and 55 to fill the sump to the level 47. The oil entering through ports 52 and 53 showers the worm bearings 24 and 25, respectively, while the oil entering through ports 54 and 55 showers the worm 26. The oil thus entering the unit flows downwardly through the housing to the sump. Bearings 12 and 13 by virtue of their relative outward tapers to the left and right, respectively, as seen in Figure 1, pump the oil outwardly to the space 49 where it flows through oil duct 50 to the sump S. A drain opening 51 is provided for the removal of sludge and water and a pipe connection with a restricted opening may be inserted in opening 51 to permit a slight flow of oil to remove sludge. Any surplus oil will pass out of the casing to the oil line through overflow port 61, thus maintaining a proper oil level.

An alternative method of lubricating is to connect an oil line to ports 45, 46, 52, 53, 54, and 55. As in the previous instance, oil entering ports 52 and 53 lubricates bearings 24 and 25, while oil entering the ports 54 and 55 lubricates worm gears 26 and 22. Oil entering ports 45 and 46 lubricates in this method, bearings 12 and 13, and oil reaching the bottom of the casing passes out the unrestricted drain opening 51 through suitable connections to the oil supply.

The above-described drive unit is a compact device readily mounted on or removed from a drier roll trunnion and capable of precise adjustment before and/or after mounting. The device is also capable of exact preloading for predetermined operating conditions. Therefore, the present drive assembly permits accurate manual adjustment to center the driven gear 26 with respect to the driving gear 22 and, after this adjustment is made, the centering is automatically maintained due to the preloading means, this effect being brought about, as previously explained, by mounting the unit on the torque arm 5 as shown in Figures 1 and 2 or as in Figure 3.

Some of the more apparent advantages of the present invention are namely (1) insurance of proper bearing clearances and gear alignment throughout a wide range of operating temperatures, (2) a provision of a compact and closed assembly, requiring a minimum amount of space and clearances, (3) the provision of an assembly having ready accessibility for oiling, inspecting, cleaning, and repairing the parts, (4) the provision of an assembly which automatically limits and corrects thermal effects on bearing clearances and gear alignment, (5) the provision of a preload centering structure which aligns the center line of the gears regardless of the amount of clearances in the bearings, (6) the provision of a flexible drive assembly, and (7) the provision of a drive assembly which may be readily mounted and which permits in connection with a paper machine, the distance between drier rolls to be altered and also is not dependent upon driving gears for positioning of the rolls.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is desired to be secured by Letters Patent is:

1. In a drive unit for a drier roll having a hollow trunnion for the passage of heating fluids, a roll supporting frame, a roll bearing on said frame, a two-part housing surrounding said trunnion, anti-friction bearings in said housing, a trunnion sleeve rotatable in said bearings and adapted to seat on said trunnion, a worm gear mounted on said sleeve, a worm mounted in said housing, meshing with said worm gear, means for preventing rotation of said housing comprising a resilient torque bar on said frame, a slotted boss on said bar, a stud on said housing, a nut on said stud engaging said boss, adjusting screws on said boss engaging said stud, whereby predetermined loading is imposed on said housing bearings and rotation of said housing is prevented.

2. In a drive unit for a drier roll having a hollow trunnion for the passage of heating fluids, a roll supporting frame, a roll bearing on said frame, a two-part housing surrounding said trunnion, anti-friction bearings in said housing, said anti-friction bearings comprising outwardly tapered rollers with outwardly inclined axes, a trunnion sleeve rotatable in said bearings and adapted to seat on said trunnion, a worm gear mounted on said sleeve, a worm mounted in said housing, meshing with said worm gear, means for preventing rotation of said housing comprising a vertically resilient torque bar on said frame, a slotted boss on said bar, a stud on said housing, a nut on said stud engaging said boss, adjusting screws on said boss engaging said stud, whereby predetermined loading is imposed on said housing bearings and rotation of said housing is prevented.

3. In a drive unit for a drier roll having a hollow trunnion for the passage of heating fluids, a roll supporting frame, a roll bearing on said frame, a two-part housing surrounding said trunnion, anti-friction bearings in said housing, said anti-friction bearings comprising outwardly tapered rollers with outwardly inclined axes, a trunnion sleeve rotatable in said bearings and adapted to seat on said trunnion, a worm gear mounted on said sleeve, a worm mounted in said housing, meshing with said worm gear, means for preventing rotation of said housing comprising a vertically resilient torque bar on said frame, a slotted boss on said bar, a stud on said housing extending through the opening in said boss, a nut on said stud, an anti-friction bearing between said boss and said nut permitting movement of said stud within said opening, adjusting screws on said boss engaging said stud, said nut providing predetermined loading on said housing bearings and said adjusting screws preventing rotation of said housing.

4. In a drive unit for a drier roll having a hollow trunnion for the passage of heating fluids and being mounted in a suitable bearing on a roll supporting frame, a two-part housing, anti-friction bearings in said housing, a trunnion sleeve rotatably mounted in said bearings and adapted to seat on said trunnion, a worm gear mounted on said sleeve, a worm rotatably mounted in said housing and meshing with said worm gear, means for preventing rotation of said housing about the trunnion comprising a torque bar mounted at one end on said frame and having a slotted boss at its other end, a stud on said housing received in said slotted boss, means for adjusting said stud in said boss, and means for retaining said stud in adjusted position.

5. In a drive unit for a drier roll or the like having trunnion means for the roll rotatably mounted on the supporting frame of the roll, housing means surrounding said trunnion means, bearing means in the housing means, said trunnion means being rotatably mounted in said bearing means, driving gear means in said housing for said trunnion means, driven gear means mounted in said housing and adapted to mesh with said driving gear means, a resilient torque bar mounted on the frame and means to mount said housing means on said torque bar whereby predetermined loading is imposed on said bearing means and said driving and driven gear means are automatically maintained centered.

6. The combination defined in claim 5, wherein manual means is provided for adjusting the axial relationships of the driving and driven means without affecting the predetermined loading.

7. The combination defined in claim 6, wherein said torque arm is vertically resilient.

8. The combination defined in claim 6, wherein said torque arm is substantially rigid and resilient means is provided for connecting the housing means with said torque bar.

9. The combination defined in claim 5, wherein said housing means and said driven gear means may be tilted without affecting the predetermined loading, and means connected with said torque arm for maintaining the housing means and driven gear means in the tilted position.

10. In a drive unit for a drier roll having a trunnion rotatably mounted on the supporting frame of the roll, said trunnion being hollow for the passage of a heat exchange medium, housing means surrounding said trunnion, bearing means in said housing, a trunnion sleeve rotatable in said bearing means and adapted to seat on said trunnion, driving gear means in said housing for said sleeve and in turn said trunnion, driven gear means mounted on said sleeve adapted to mesh with driving gear means, a resilient torque bar solely supported by said frame and means to mount said housing means on said torque bar whereby predetermined loading is imposed on said bearing means and said driving and driven gear means are automatically maintained centered.

11. The combination defined in claim 5, wherein the means for mounting the housing means on said bar includes bearing means permitting limited horizontal movement of said housing and thus said driven gear means independently or without affecting the predetermined loading.

References Cited in the file of this patent

UNITED STATES PATENTS

| Number | Name | Date |
|---|---|---|
| 1,520,935 | Crandell | Dec. 30, 1924 |
| 2,037,242 | Kutter | Apr. 14, 1936 |
| 2,603,983 | Rieser | July 22, 1952 |
| 2,606,453 | Firth | Aug. 12, 1952 |
| 2,612,788 | Christian | Oct. 7, 1952 |